Patented Feb. 6, 1934

1,946,205

UNITED STATES PATENT OFFICE 1,946,205

COATED PAPER AND PROCESS OF PRODUCING SAME

Charles L. Gabriel, Lawrence, N. Y., assignor to Commercial Solvents Corporation, Terre Haute, Ind., a corporation of Maryland No Drawing. Application July 2, 1931
Serial No. 548,483

18 Claims. (Cl. 91—68)

This invention relates to coated papers and a process of producing same.

In the past complicated and expensive methods of packing have been required of various articles which may be subject to deterioration either by contact with moisture or with the atmosphere itself, or on the other hand, by the loss of essential constituents of the article through evaporation. For example, the flavor and other desirable properties of cigarettes, cigars, and other tobacco products are materially affected by changes in the moisture content of the products. In order to maintain the moisture content of such products uniform, it has been customary to wrap them in tin foil, glassine, cellophane, and more recent still, in coated cellophane. Food products such as coffee gradually lose by evaporation appreciable proportions of their essential oil and flavor content unless packed in metal or other suitable containers which may be sealed so as to prevent a loss of these constituents.

From the point of view of the distributors the appearance of an article also has a very important bearing upon its marketability and for this reason the transparency of the wrapping material is most important. A wrapping material which in addition to being impervious to moisture and gases, is also transparent so as to allow inspection of the article to be sold, is particularly desirable for packages containing practically all varieties of food stuffs. Such wrapping materials are also very advantageously employed for protecting many other types of articles subject to easy soiling, as for example, stationery, clothing, etc.

The various types of wrapping materials previously available are subject to a great many disadvantages. Tin and lead foils are both relatively expensive and opaque and in addition, lead foil is unsuitable for wrapping certain foodstuffs due to its toxic properties. Ordinary cellophone is not only permeable to moisture and gases but is also fairly expensive. Coated cellophane is moisture and gas proof but possesses the important disadvantage of being still more expensive than the uncoated grade of cellophane. Glassine is neither moisture proof nor very transparent. Paraffin coated paper is not completely transparent and in addition, possesses certain other important disadvantages.

I have now discovered a new form of moisture proof transparent wrapping paper which possesses the desirable properties of the materials just enumerated, with the important advantage of being much cheaper than any similar previously known material. My new paper may be produced by impregnating paper with compositions comprising cellulose esters and neutral esters formed by the interaction of dihydric alcohols and polybasic acids.

When, for example, ethylene glycol is heated with phthalic anhydride, a half ester of phthalic acid is first easily formed. By conducting the operation in the presence of an esterification catalyst and continued heating the free carboxyl and hydroxyl groups present in the half ester first formed may be caused to react, producing a neutral ester of the following formula:

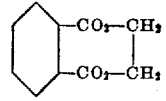

It is generally impossible, however, to conduct the reaction so that the product comprises only the neutral glycol phthalate ester above shown, since one molecule of the product containing the free hydroxyl and the free carboxyl groups will react with another molecule, producing various other compounds of high molecular weight. The following equations will illustrate the type of reaction thus taking place and the nature of the product formed:

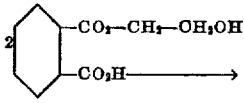

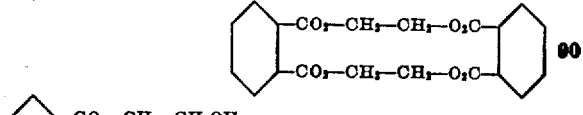

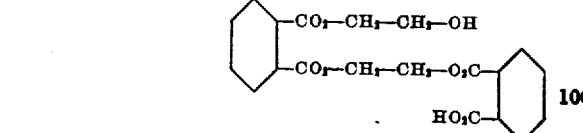

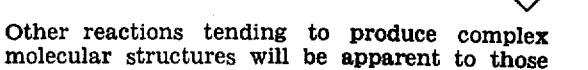

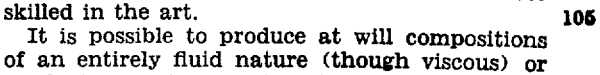

Other reactions tending to produce complex molecular structures will be apparent to those skilled in the art.

It is possible to produce at will compositions of an entirely fluid nature (though viscous) or products so viscous at ordinary temperatures that they can not be poured. The nature of the products, including the molecular weight, depends upon the condition of synthesis. Liquid products with molecular weights of 500 or less may be prepared by conducting the reaction quickly and at relatively low temperatures. Products having molecular weights of about 900 or above may be produced by the use of longer reaction periods and higher temperatures. The following example will illustrate a general method of obtaining neutral esters of dihydric alcohols and polybasic organic acids.

*Example*

74 grams of phthalic anhydride and 20 grams of ethylene glycol are heated together at 150° C. for ½ hour. 5 c. c. of concentrated sulphuric acid, 11 grams of glycol, and 5 grams of benzol are then added and the mixture heated to distill off the benzol. After the benzol vapor distills off it carries with it, as a constant boiling mixture, the water formed during the reaction. Heating is then continued for 3 hours, benzol being added from time to time as needed. In this manner, the reaction temperature is maintained at 100° C. or less, the product is washed with alkali and water, and dried in vacuo at 150° C. It is found to be a viscous oily liquid showing a molecular weight of slightly less than 500 and is easily soluble in benzol and other common solvents.

This type of product may also be prepared by heating equal molar portions of glycol and phthalic anhydride at 180° C. for 1 hour and then further condensing by heating at the same temperature, in vacuo for varying periods of time, thus obtaining varied degrees of condensation. If a neutral product is desired it will generally be necessary to wash this product with dilute alkali.

It is, of course, possible to substitute for both of the reactants used in the specific example above various other materials so as to obtain products such as 1,3-butylene phthalate, ethylene mellitate, ethylene sebacate, 1,3-butylene sebacate, ethylene propylmalonate, ethylene succinylo succinate, etc.

In preparing my new coated paper I use a cellulose ester and a neutral ester formed by the interaction of a dihydric alcohol and a polybasic acid, preferably incorporated in the suitable solvent and diluent so as to facilitate the coating or impregnation of the paper. The following examples will illustrate compositions of the character contemplated as suitable for coating papers:

*Example I*

|  | Percent |
|---|---|
| Cellulose nitrate | 10–30 |
| Ethylene glycol phthalate | 90–70 | dissolved in a solvent mixture consisting of:

|  | Percent |
|---|---|
| Ethyl acetate | 40–50 |
| Toluol | 25–35 |
| Ethanol | 5–15 |
| Butyl acetate | 5–10 |

*Example II*

|  | Percent |
|---|---|
| Cellulose acetate | 10–20 |
| Propylene glycol phthalate | 90–80 | dissolved in a solvent mixture consisting of:

|  | Percent |
|---|---|
| Acetone | 70 |
| Toluol | 10 |
| Diacetone alcohol | 20 |

If desired a soluble dye of any particular color may be incorporated in mixtures such as those cited above so as to give a colored paper.

The relative proportion of the constituents used in the examples cited above may, of course, be varied considerably without departing from the scope of my invention. It is generally preferred, however, to use a fairly large excess of the said mixed ester as compared to cellulose ester. It is preferred also to use a solvent or solvent mixture which will evaporate and leave a dry film rather quickly. In case, however, forced drying or drying in an atmosphere of low humidity is not employed, the solvent mixture should be regulated so that the evaporation of the solvent will not be so rapid as to cause "blushed" or opaque films. This may generally be prevented by incorporating in the solvent mixture small amounts of high boiling solvents such as butyl acetate, diacetone alcohol, etc.

The composition comprising cellulose esters and ethylene glycol phthalate or other similar mixed esters may be satisfactorily applied to the paper in a number of ways, and it may be applied to one or both sides of the paper, if desired. For example, long sheets of the paper to be coated may be passed through a bath containing the cellulose ester-ethylene glycol phthalate solution and thence preferably between rolls or scrapers to remove the excess solution. The sheet is then preferably passed through a heated tunnel where the solvents are expelled from the sheet, leaving it coated or impregnated with the cellulose ester-ethylene glycol phthalate composition. When dried the coated sheet may be rolled, folded, or otherwise disposed of. The expelled solvents may be recovered, if desired, by the usual solvent recovery methods.

The thickness of the film applied to the paper may be regulated by varying the quantity of the solvent, the proportion of cellulose ester to ethylene glycol phthalate or other similar mixed esters, the grade (viscosity) of cellulose ester, the distance of the rolls or scrapers from the paper, etc. For most purposes, a coating approximately 0.0015 inch thick gives very satisfactory results.

The coated sheets produced as hereinabove disclosed are substantially impervious to moisture and gases, possess a satisfactory degree of flexibility and are not appreciably affected by greasy or moist articles with which they come in contact. They also possess the advantage of being substantially transparent when a paper such as tissue paper, glassine, or other thin paper is employed as the material to be coated. They are also much cheaper to manufacture than other transparent moisture proof wrapping papers of similar character. Now having disclosed my invention, what I desire to claim is:

1. As a new article of manufacture, a paper treated with a composition containing a cellulose ester, the major non-volatile constituent of said composition consisting of a neutral ester resulting from the reaction of a dihydric alcohol and a polybasic acid.

2. As a new article of manufacture, a paper treated with a composition containing nitrocellulose, the major non-volatile constituent of said composition consisting of a neutral ester resulting from the reaction of a dihydric alcohol and a polybasic acid.

3. As a new article of manufacture, a paper treated with a composition containing nitrocellulose, the major non-volatile constituent of said composition consisting of a neutral ester resulting from the reaction of ethylene glycol and a polybasic aromatic acid.

4. As a new article of manufacture, a paper treated with a composition containing nitrocellulose, the major non-volatile constituent of said composition consisting of an alkylene phthalate.

5. As a new article of manufacture, a paper treated with a composition containing nitrocellulose, the major non-volatile constituent of said composition consisting of ethylene phthalate.

6. As a new article of manufacture, a paper treated with a composition containing nitrocellulose, from 70-90% of the non-volatile constituents of said composition consisting of a neutral ester resulting from the reaction of a dihydric alcohol and a polybasic acid.

7. As a new article of manufacture, a paper treated with a composition containing nitrocellulose, from 70-90% of the non-volatile constituents of said composition consisting of a neutral ester resulting from the reaction of ethylene glycol and a polybasic aromatic acid.

8. As a new article of manufacture, a paper treated with a composition containing nitrocellulose, from 70-90% of the non-volatile constituents of said composition consisting of an alkylene phthalate.

9. As a new article of manufacture, a paper treated with a composition containing nitrocellulose, from 70-90% of the non-volatile constituents of said composition consisting of ethylene phthalate.

10. A process for producing coated paper which comprises applying to paper a solution containing a cellulose ester, the major non-volatile constituent of said solution consisting of a neutral ester resulting from the reaction of a dihydric alcohol and a polybasic acid.

11. A process for producing coated paper which comprises applying to paper a solution containing nitrocellulose, the major non-volatile constituent of said solution consisting of a neutral ester resulting from the reaction of a dihydric alcohol and a polybasic acid.

12. A process for producing coated paper which comprises applying to paper a solution containing nitrocellulose, the major non-volatile constituent of said solution consisting of a neutral ester resulting from the reaction of ethylene glycol and a polybasic aromatic acid.

13. A process for producing coated paper which comprises applying to paper a solution containing nitrocellulose, the major non-volatile constituent of said solution consisting of an alkylene phthalate.

14. A process for producing a coated paper which comprises applying to paper a solution containing nitrocellulose, the major non-volatile constituent of said solution consisting of ethylene phthalate.

15. A process for producing a coated paper which comprises applying to paper a solution containing nitrocellulose, from 70-90% of the non-volatile constituents of said solution consisting of a neutral ester resulting from the reaction of a dihydric alcohol and a polyphase acid.

16. A process for producing a coated paper which comprises applying to paper a solution containing nitrocellulose, from 70-90% of the non-volatile constituents of said solution consisting of a neutral ester resulting from the reaction of ethylene glycol and a polybasic aromatic acid.

17. A process for producing a coated paper which comprises applying to paper a solution containing nitrocellulose, from 70-90% of the non-volatile constituents of said solution consisting of an alkylene phthalate.

18. A process for producing a coated paper which comprises applying to paper a solution containing nitrocellulose, from 70-90% of the non-volatile constituents of said solution consisting of ethylene phthalate.

CHARLES L. GABRIEL.

CERTIFICATE OF CORRECTION.

Patent No. 1,946,205.　　　　　　　　　　　February 6, 1934.

CHARLES L. GABRIEL.

It is hereby certified that error appears in the printed specification of the above numbered patent requiring correction as follows: Page 3, line 6 of claim 15, for "polyphase" read polybasic; and that the said Letters Patent should be read with this correction therein that the same may conform to the record of the case in the Patent Office.

Signed and sealed this 3rd day of April, A. D. 1934.

F. M. Hopkins (Seal)　　　　　　　　　　　Acting Commissioner of Patents.

composition consisting of a neutral ester resulting from the reaction of ethylene glycol and a polybasic aromatic acid.

4. As a new article of manufacture, a paper treated with a composition containing nitrocellulose, the major non-volatile constituent of said composition consisting of an alkylene phthalate.

5. As a new article of manufacture, a paper treated with a composition containing nitrocellulose, the major non-volatile constituent of said composition consisting of ethylene phthalate.

6. As a new article of manufacture, a paper treated with a composition containing nitrocellulose, from 70-90% of the non-volatile constituents of said composition consisting of a neutral ester resulting from the reaction of a dihydric alcohol and a polybasic acid.

7. As a new article of manufacture, a paper treated with a composition containing nitrocellulose, from 70-90% of the non-volatile constituents of said composition consisting of a neutral ester resulting from the reaction of ethylene glycol and a polybasic aromatic acid.

8. As a new article of manufacture, a paper treated with a composition containing nitrocellulose, from 70-90% of the non-volatile constituents of said composition consisting of an alkylene phthalate.

9. As a new article of manufacture, a paper treated with a composition containing nitrocellulose, from 70-90% of the non-volatile constituents of said composition consisting of ethylene phthalate.

10. A process for producing coated paper which comprises applying to paper a solution containing a cellulose ester, the major non-volatile constituent of said solution consisting of a neutral ester resulting from the reaction of a dihydric alcohol and a polybasic acid.

11. A process for producing coated paper which comprises applying to paper a solution containing nitrocellulose, the major non-volatile constituent of said solution consisting of a neutral ester resulting from the reaction of a dihydric alcohol and a polybasic acid.

12. A process for producing coated paper which comprises applying to paper a solution containing nitrocellulose, the major non-volatile constituent of said solution consisting of a neutral ester resulting from the reaction of ethylene glycol and a polybasic aromatic acid.

13. A process for producing coated paper which comprises applying to paper a solution containing nitrocellulose, the major non-volatile constituent of said solution consisting of an alkylene phthalate.

14. A process for producing a coated paper which comprises applying to paper a solution containing nitrocellulose, the major non-volatile constituent of said solution consisting of ethylene phthalate.

15. A process for producing a coated paper which comprises applying to paper a solution containing nitrocellulose, from 70-90% of the non-volatile constituents of said solution consisting of a neutral ester resulting from the reaction of a dihydric alcohol and a polyphase acid.

16. A process for producing a coated paper which comprises applying to paper a solution containing nitrocellulose, from 70-90% of the non-volatile constituents of said solution consisting of a neutral ester resulting from the reaction of ethylene glycol and a polybasic aromatic acid.

17. A process for producing a coated paper which comprises applying to paper a solution containing nitrocellulose, from 70-90% of the non-volatile constituents of said solution consisting of an alkylene phthalate.

18. A process for producing a coated paper which comprises applying to paper a solution containing nitrocellulose, from 70-90% of the non-volatile constituents of said solution consisting of ethylene phthalate.

CHARLES L. GABRIEL.

CERTIFICATE OF CORRECTION.

Patent No. 1,946,205.　　　　　　　　　　　　　February 6, 1934.

CHARLES L. GABRIEL.

It is hereby certified that error appears in the printed specification of the above numbered patent requiring correction as follows: Page 3, line 6 of claim 15, for "polyphase" read polybasic; and that the said Letters Patent should be read with this correction therein that the same may conform to the record of the case in the Patent Office.

Signed and sealed this 3rd day of April, A. D. 1934.

F. M. Hopkins (Seal)　　　　　　　　　　　　　　　　Acting Commissioner of Patents.